(12) United States Patent
Stiesdal

(10) Patent No.: US 8,698,361 B2
(45) Date of Patent: Apr. 15, 2014

(54) ARRANGEMENT FOR COOLING OF AN ELECTRICAL MACHINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 328 days.

(21) Appl. No.: 12/905,300

(22) Filed: Oct. 15, 2010

(65) Prior Publication Data
US 2011/0101700 A1 May 5, 2011

(30) Foreign Application Priority Data

Nov. 5, 2009 (EP) .................................. 09013910

(51) Int. Cl.
*H02K 9/00* (2006.01)
*H02K 9/08* (2006.01)

(52) U.S. Cl.
USPC .................. 310/52; 310/54; 310/57; 310/58; 310/60 A

(58) Field of Classification Search
USPC ................................ 310/54, 58, 52, 57, 60 A
See application file for complete search history.

(56) References Cited

U.S. PATENT DOCUMENTS

| | | | |
|---|---|---|---|
| 3,414,749 A | 12/1968 | Abegg | |
| 4,228,375 A * | 10/1980 | Beermann et al. | 310/214 |
| 5,058,660 A | 10/1991 | Hedstrom | |
| 2004/0012272 A1 | 1/2004 | Houle et al. | |
| 2005/0012409 A1 * | 1/2005 | Philippart | 310/54 |
| 2005/0067904 A1 * | 3/2005 | Houle et al. | 310/54 |
| 2006/0163954 A1 * | 7/2006 | Biais | 310/54 |
| 2007/0024132 A1 | 2/2007 | Salamah et al. | |
| 2009/0261668 A1 * | 10/2009 | Mantere | 310/54 |

FOREIGN PATENT DOCUMENTS

| | | |
|---|---|---|
| DE | 196 36 591 A1 | 3/1998 |
| EP | 08 018 802 A1 | 11/1980 |
| EP | 2 110 931 A2 | 10/2009 |
| EP | 2163528 A1 | 3/2010 |
| GB | 2 343 060 A | 4/2000 |
| GB | 2343060 A * | 4/2000 |
| JP | 52071609 A * | 6/1977 |
| JP | 10053131 A | 2/1998 |
| JP | 10336965 A * | 12/1998 |
| JP | 2001119891 A1 | 4/2001 |
| WO | WO 2006045772 A1 | 5/2006 |

* cited by examiner

*Primary Examiner* — Tran Nguyen
*Assistant Examiner* — Jose Gonzalez Quinones

(57) ABSTRACT

An arrangement for cooling of an electrical machine is disclosed. The electrical machine includes a stator-arrangement and a rotor-arrangement. The stator-arrangement is mounted on an outer surface of a support-structure. At least one cooling channel is arranged between the stator-arrangement and the support-structure in a way that the cooling-channel is pressed between the stator-arrangement and the support structure.

14 Claims, 7 Drawing Sheets

ARRANGEMENT FOR COOLING OF AN ELECTRICAL MACHINE

CROSS REFERENCE TO RELATED APPLICATIONS

This application claims priority of European Patent Office application No. 09013910.6 EP filed Nov. 5, 2009, which is incorporated by reference herein in its entirety.

FIELD OF INVENTION

The invention relates to an arrangement for cooling of an electrical machine. In a preferred configuration it relates to the cooling of a generator in a wind-turbine.

BACKGROUND OF INVENTION

Electrical machines need cooling to dissipate the heat, which is generated during the operation of the machine. The heat is generated by ohmic resistance, iron hysteresis, etc.

It is possible to cool a small electrical machine by a heat-transfer from the inside of the machine to its surface. This is not possible for a large machine, which shows a relatively small surface per power rating and heat generation.

When a machine is installed indoors (in a dry atmosphere) it is possible to operate the machine without housing. The cooling of the machine is achieved by a circulation of ambient air through the machine.

If the electrical machine is installed under harsh conditions, for example when the generator is used in an offshore wind turbine, the electrical machine needs to be totally enclosed. Salty ambient air must not be allowed to circulate through the machine. For this specific situation a dedicated system for cooling is required.

One very common cooling method is the circulation of air or another gaseous medium inside the electrical machine, while the cooling medium is kept cool by a heat exchanger. The cooling system for a large electrical machine, like a wind-turbine-generator, becomes big and expensive when air cooling is used.

A more cost effective design is achieved, if a liquid cooling system is used. However it is difficult to implement it in a robust and efficient design. The reason is that a number of cooling channels need to be integrated or attached to the generator near the areas, where the heat is generated.

The European patent-application EP 08 018 802 show a cooling arrangement for a generator. The generator contains a stator, which shows a number of stacked laminate plates. The laminate plates carry on a first side a number of stator coils, while the stator coils interact with a rotor of the generator. The first side is opposite an air gap, which is between the stator and the rotor. There is a fixing-arrangement, which is used to fix the stacked laminate-plates. The fixing-arrangement is located on a second side of the laminate plates, while this second side is opposite the first side. Heat is generated near the stator coils and within the laminate plates as described above. To transfer the heat the fixing-arrangement is designed to be used as a tube for a cooling-liquid. So the generated heat is transferred from the metal-windings of the stator coil and the laminate-plates to the cooling-medium by heat-conduction.

This arrangement shows a disadvantage—it is very difficult—to ensure a good thermal-contact between the laminate-plates and the tubes, which are used for the cooling.

A thermal-expansion between the laminate-plates and the cooling-channels may lead to small air-gaps between the laminate plates and the cooling-channels, so the heat-transfer is affected negatively.

US 2007 024 132 A1 describes a wind turbine generator. The generator includes a stator with a core and a plurality of stator windings. The windings are mounted in a circumferentially spaced manner around the longitudinal axis of the generator.

A rotor rotates around the generator's longitudinal axis. The rotor includes a plurality of magnetic elements coupled to the rotor. The magnetic elements work in conjunction with the stator windings, to generate power by the magnetic field in the stator windings.

There is a heat pipe assembly, which is thermally engaged with the stator and the rotor to dissipate the generated heat. It is very difficult to arrange the cooling pipes inside the stator, especially in a setup of a production.

It is even more difficult to handle the cooling-arrangement in a repair situation. Furthermore, it is difficult to position the cooling channels inside the stator and at the same time to ensure a film and an effective thermal contact.

SUMMARY OF INVENTION

It is therefore the aim of the present invention, to provide an improved cooling arrangement for an electrical machine in particular for a wind-turbine generator.

This aim is realized by the features of the independents claims. Advantageous configurations of the invention are described within the dependent claims.

The cooling-arrangement according to the invention comprises a stator-arrangement and a rotor-arrangement.

The stator-arrangement is mounted on the outer surface of a support-structure. At least one cooling channel is arranged between the stator-arrangement and the support-structure in a way that the cooling-channel is pressed between the stator-arrangement and the support structure.

Preferably the stator-arrangement and the rotor-arrangement form a so called "outer rotor-inner stator" arrangement. In this case the stator-arrangement is surrounded by the rotor-arrangement, while the rotor-arrangement rotates around the longitudinal-axis of the stator-arrangement.

The stator-arrangement is mounted in a radial manner on an outer surface of a support-structure.

Preferably the support-structure is fixed via rigid connections to a generator-shaft.

At least one cooling-channel is arranged to circulate a medium for cooling of the stator.

The cooling-channel is arranged between the stator-arrangement and the support-structure in a way that the cooling-channel is pressed against the stator-arrangement to achieve a very effective thermal contact.

Due to the effective thermal connection an effective dissipation of heat from the stator-arrangement to the cooling-channel is achieved.

Due to the fact that the cooling channel is pressed against the stator-arrangement pockets of air between the cooling-channel and the stator-arrangement are minimized or even avoided.

According to the invention and in view of the well established technology discussed above there is no longer the need to integrate cooling-channels into the stator-arrangement. So the complexity of the stator-arrangement is kept low.

Preferably the electrical machine is a generator, in particular a generator for a wind turbine. Preferably the generator is a so called "direct drive generator" with a typical diameter of between 4 and 5 meters.

Preferably the stator-arrangement is constructed in a segmented manner, so the stator-arrangement contains a plurality of stator-segments forming the stator.

Preferably the stator-arrangement of the electrical machine will have a cylindrical form.

The segmented stator-arrangement allows the dismantling of a single stator-segment from the electrical machine. In this way access to the cooling-channel is very easily possible, as it is located below the dismantled stator-segment. This is a great advantage for repair-purposes.

Preferably each stator-segment shows at least one cooling-channel, which is designed to cool the dedicated stator-segment. Preferably the cooling-channel is connected directly with an assigned heat-transfer-unit, so the overall-length of the cooling-channel is reduced.

This allows the repair and the exchange of a single section of the cooling-channel without the need to dismantle the whole electrical machine.

This is very important for generators of wind turbines, especially for offshore-turbines, as any work there is time consuming, difficult and expensive, too.

The invention allows the repair and the exchange of parts of the cooling-channel in the nacelle, without the need for further external tools like a crane.

The contact-area or the volume between the stator-arrangement and the support-structure is filled preferably with a thermal conductive material.

This material might be a thermal paste or a resin with thermal conductive properties for example.

In this way an effective thermal connection between the support-structure and the stator-arrangement is achieved.

Preferably the support-structure should be made of a material with a relatively high thermal capacity, for example steel or copper. By the use of filing-material within the volume or at the contact-area it is easy to keep the temperature of the generator at a certain predefined low level.

Preferably the cooling-channel is designed as a cooling-pipe. This allows using standard components, which are available in many different sizes and materials.

Preferably the cooling-channel should be made of metal, like copper, to arrange an effective thermal bridge between the cooling medium and the stator.

A flexible pipe, made of plastic or the like, can be used too. As a plastic pipe can be shaped and installed easily by hand a planned production setup is also simplified. Furthermore the weight of the plastic pipe is quite low and its flexibility contributes to a good technical solution for generators in a wind turbine, where space for repair work is limited.

Preferably the cooling-channel has a rectangular cross-sectional, where the longer side of the rectangular cross-section contacts the stator-arrangement. Thus a larger contact surface and a better thermal connection are achieved.

Preferably a number of cooling-channels are aligned in parallel so that they penetrate the generator axially in reference to the longitudinal axis of the generator. This enlarges the contact area for cooling-purposes between the cooling-structure and the stator-arrangement.

Preferably a first cooling-channel has an inlet for the cooling medium at a first end of the generator, while the first cooling-channel has an outlet for the cooling medium at a second end of the generator. The first end of the generator is opposite the second end of the generator in relation to the longitudinal-axis of the generator.

The outlet of the first cooling-channel is located next to an inlet of a second cooling channel, which is parallel to the first cooling-channel. This structure is repeated accordingly.

Thus an uniform cooling of the generator is achieved as the cooling medium interchanges between both ends of the stator-arrangement. Thus one end of the generator being warmer than the other is avoided.

BRIEF DESCRIPTION OF THE DRAWINGS

The invention is shown in more detail with the help of some figures.

The figures shown are an example and do not limit the scope of the arrangement invented.

DETAILED DESCRIPTION OF INVENTION

Figure 1:
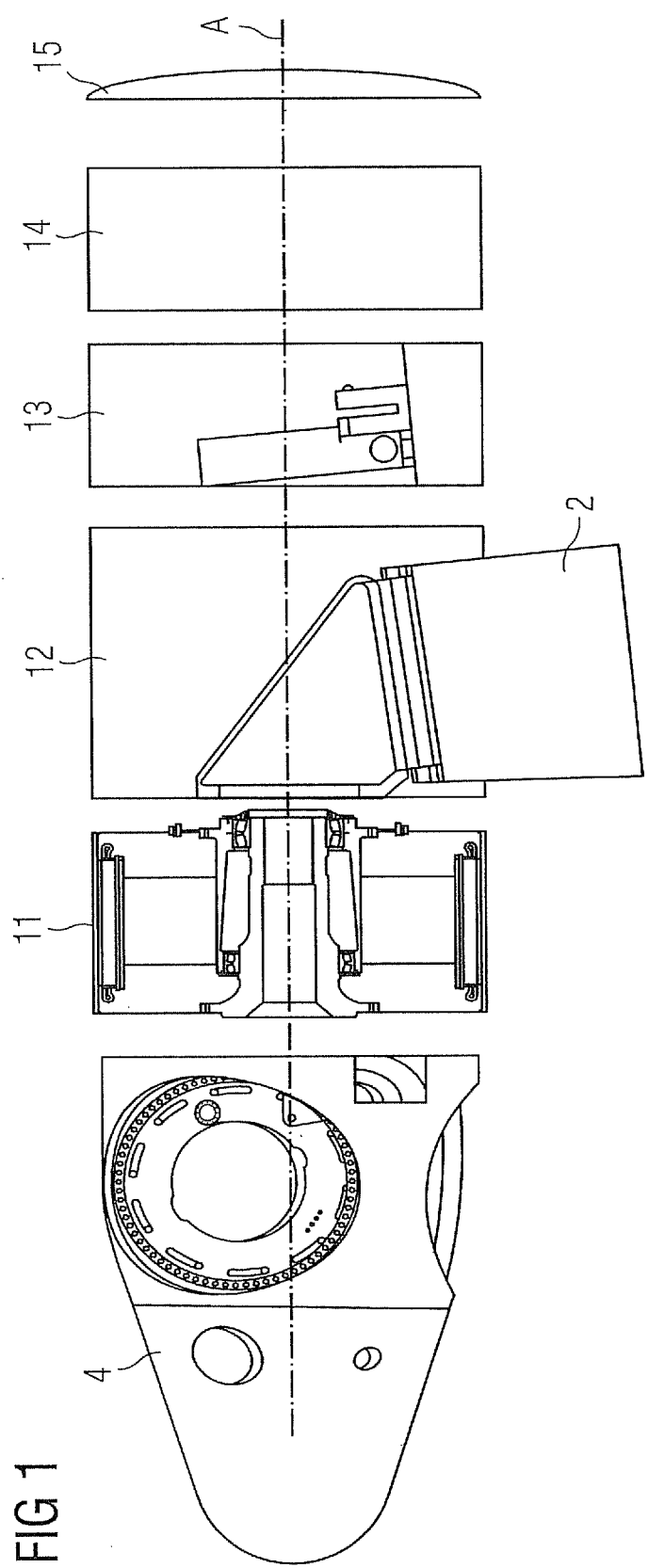
FIG. 1 shows parts of a wind turbine to be used as basis/support for the arrangement invented.

FIG. 1 shows principle parts of a wind turbine to be used as basis for the arrangement invented.

The wind-turbine contains a hub 4, a generator 11, a load/bearing section 12, a control unit 13, a cooling-equipment-unit 14 and an end cap 15.

The hub 4 is used to carry rotor-blades of the wind-turbine. The load/bearing section 12 is connected to a tower 2—not shown here in detail.

Figure 2:
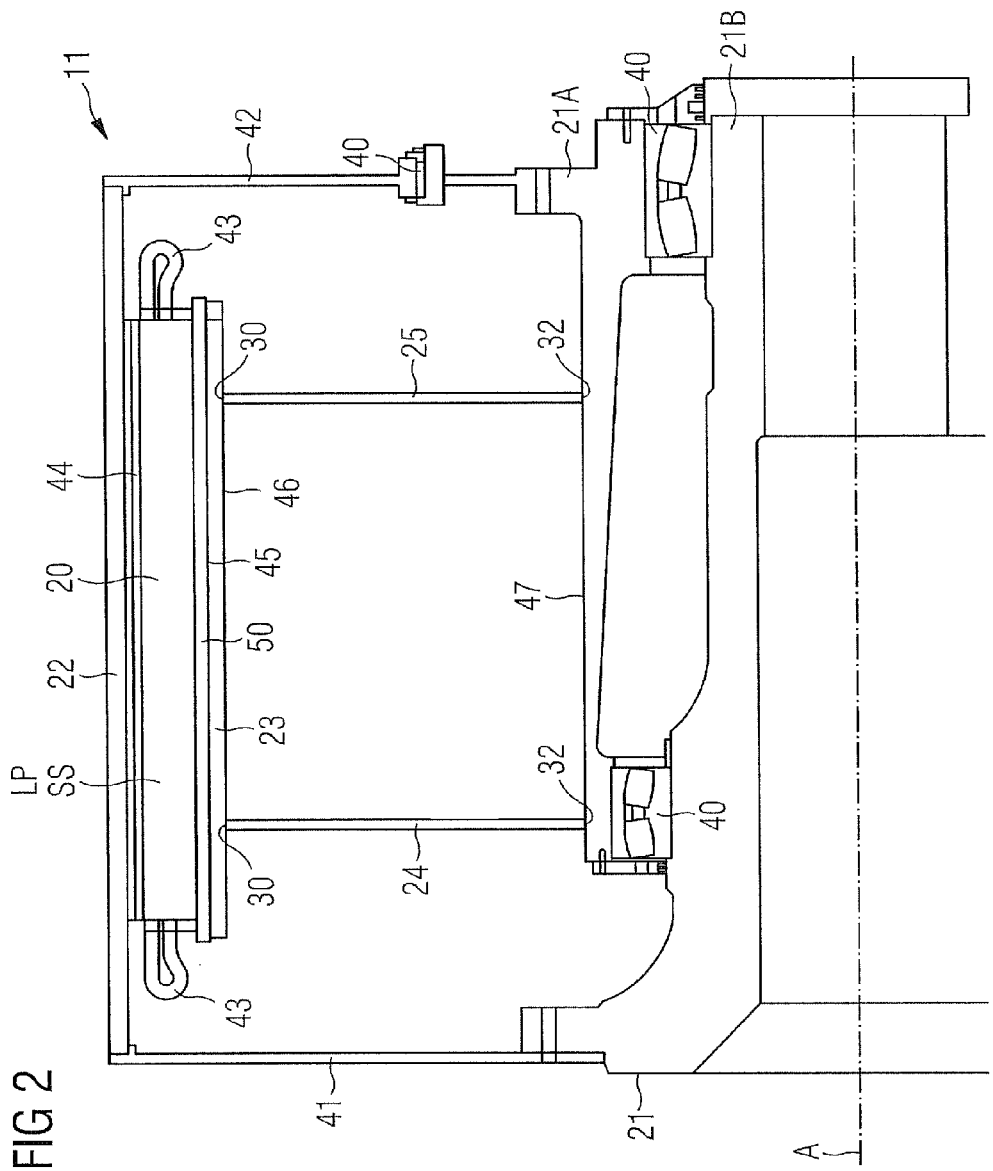
FIG. 2 shows a sectional drawing of a generator, which contains the cooling-arrangement invented.

FIG. 2 shows, with reference to FIG. 1, a sectional drawing of the generator 11, which contains the cooling-arrangement invented.

The generator 11 contains a shaft 21, an outer rotor 22 and an inner stator. The inner stator contains an inner stator-arrangement 20. The outer rotor 22 rotates around an axis of rotation A.

The shaft 21 mainly contains two separate parts—an outer stationary part 21A and an inner rotating part 21B, which are connected via bearings 40. The inner rotating part 21B of the shaft 21 is driven by the blades of the hub 4, so it revolves around the axis of rotation A.

Tightly fixed to the rotating part 21B of the shaft 21 is a first rotor end-plate 41 on the left hand side and a second rotor end-plate 42 on the right hand side of FIG. 2. Both rotor end-plates 41, 42 are connected to the outer rotor 22. Thereby a casing of a stator arrangement is constructed.

The second rotor end-plate 42 is attached to a bearing 40 that provides a loose connection to the fixed stationary part 21A of the shaft 21. The first and the second rotor endplate 41, 42 form, together with the outer rotor 22, the casing of the stator arrangement.

The stator-arrangement 20 is indicated here by a single stator segment SS, which comprises a number of stacked laminate plates LP. The stator-arrangement 20 shows a single winding 43. The winding 43 is supported by a number of slots. The slots are provided by the stacked laminate plates LP.

There is an air-gap 44 between the outer rotor 22 and the stator-arrangement 20.

A tube-like cylinder is used as support-structure 23. The support structure 23 is provided to support the stator-arrangement 20.

In connection with the whole generator 11 the support-structure 23 assembles and supports all needed stator segments SS of the generator 11.

Preferably the support-structure 23 shows—to a large extent—a same length as the length of the laminate-plates LP of the stator-segment SS.

The stator segment SS as part of the stator-arrangement 20 is fixed to an outer surface 45 of the support-structure 23

At an inner surface 46 of the support-structure 23 two end-plates 24, 25 are attached to a circular circumference 30 of the end-plates 24, 25.

The end-plates 24, 25 are also attached via an inner circumference 32 to an outer surface 47 of the outer stationary part 21A of the shaft 21.

The shaft 21 is in the centre of the generator 11 and rotates in a circular direction around the axis of rotation A.

In this configuration the end-plates 24, 25 are fixed to the outer stationary part 21A of the shaft 21, so they do not rotate. The end-plates 24, 25 themselves are shaped like a disc, with a small height and a large outer radius.

Example values for a generator 11 with an air-gap-radius of 2000 mm and a laminate stack height of 200 mm is a height of 300 mm for each end plate 24, 25 —or larger—to reach the necessary stiffness. (values really necessary here or should we better delete this paragraph?)

At least one cooling-channel 50 is arranged between the support-structure 23 and the stator-arrangement 20. The cooling tube 50 is used to circulate a cooling-medium to dissipate the heat from the stator.

The cooling-channel 50 is arranged between the stator-arrangement 20 and the support-structure 23 in a way that the cooling-channel 50 is pressed by the stator-arrangement 20 against the support-structure 23 (and/or vice versa) to achieve a very effective thermal contact between them.

Figure 3:
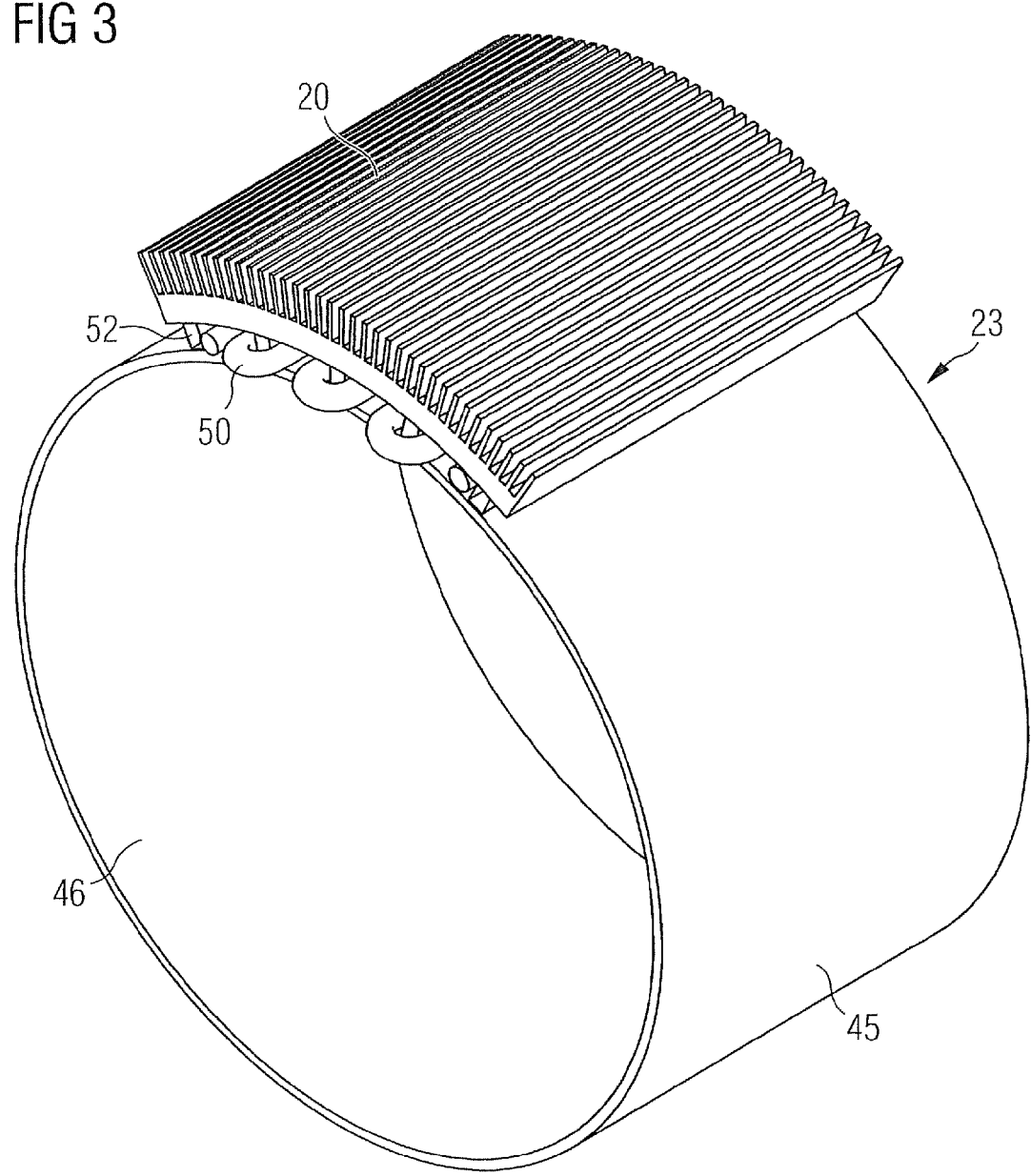
FIG. 3 and FIG. 4 show parts of the generator, cooled by the arrangement invented.
Figure 4:
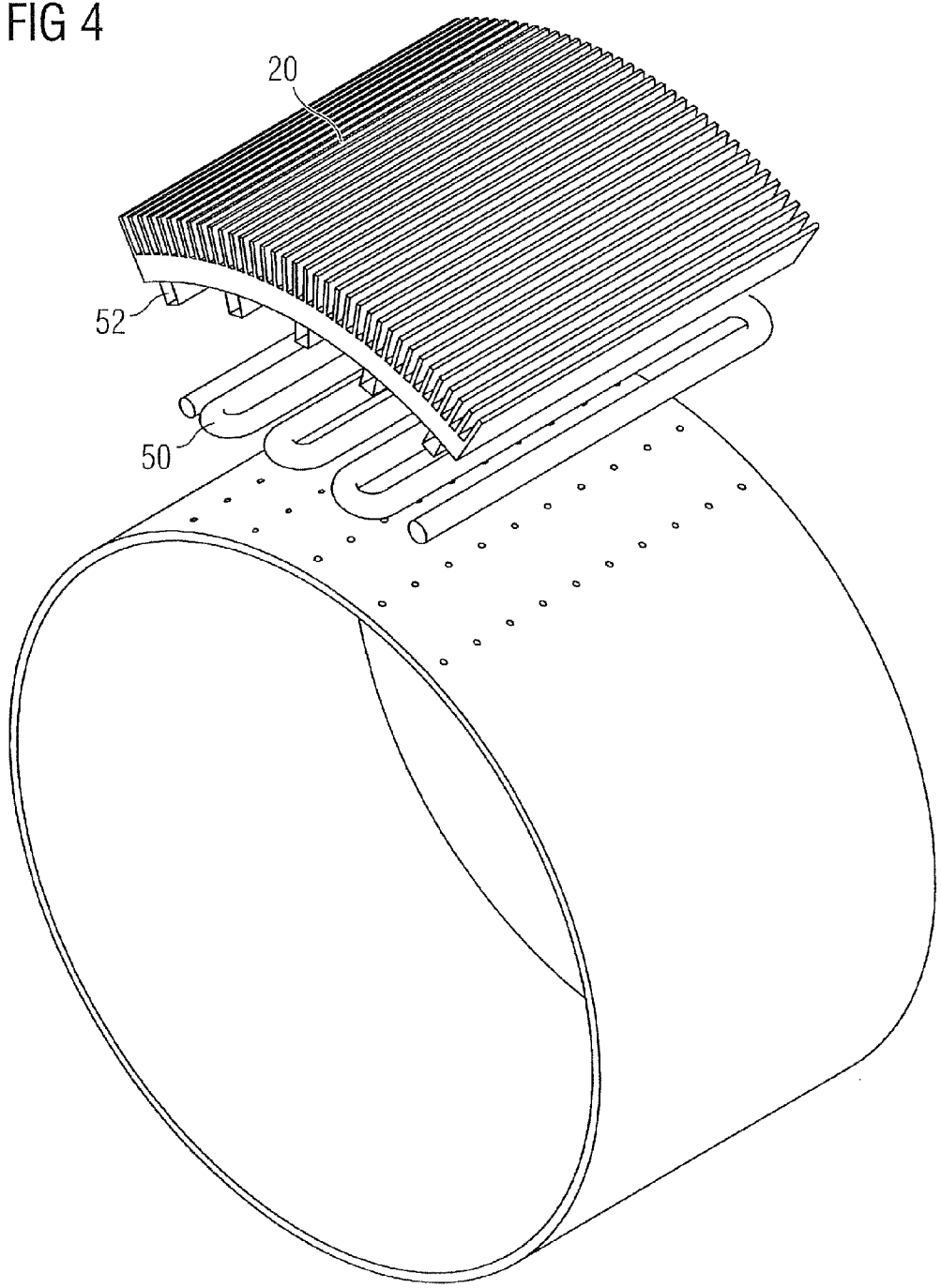

FIG. 3 and FIG. 4 show parts of the generator 11, cooled by the arrangement invented.

FIG. 3 shows—referring to FIG. 1 and FIG. 2—a section of the generator assembly. The stator-arrangement 20 is shown here as a segment. This segmented stator-arrangement shows the advantages described above.

The segment of the stator-arrangement 20 show—referring to FIG. 2—the number of slots of the stacked laminate plates LP, which are used to support the winding 43 of the stator-coil.

The segment of the stator-arrangement 20 is supported by the support structure 23. The cooling-channel 50 and a number of transverse displacement rods 52 are located between the segment of the stator-arrangement 20 and the support-structure 23.

Preferably the cooling-channel 50 has a diameter which is a little bit larger than the diameter of the displacement rods 52. The difference between the diameters should be approximately 0.5 mm.

This allows squeezing the cooling-channel 50, when the segment of the stator-arrangement 20 is fastened towards the support-structure 23. In this way an effective thermal contact is achieved and air-pockets between the components 20, 23 are reduced or even non-existent.

The cooling-channel 50 might be deformed slightly when the stator-arrangement 20 is tightened to the outer surface 45 of the support structure 23.

FIG. 4 shows the configuration of FIG. 3 in an exploded view.

Figure 5:
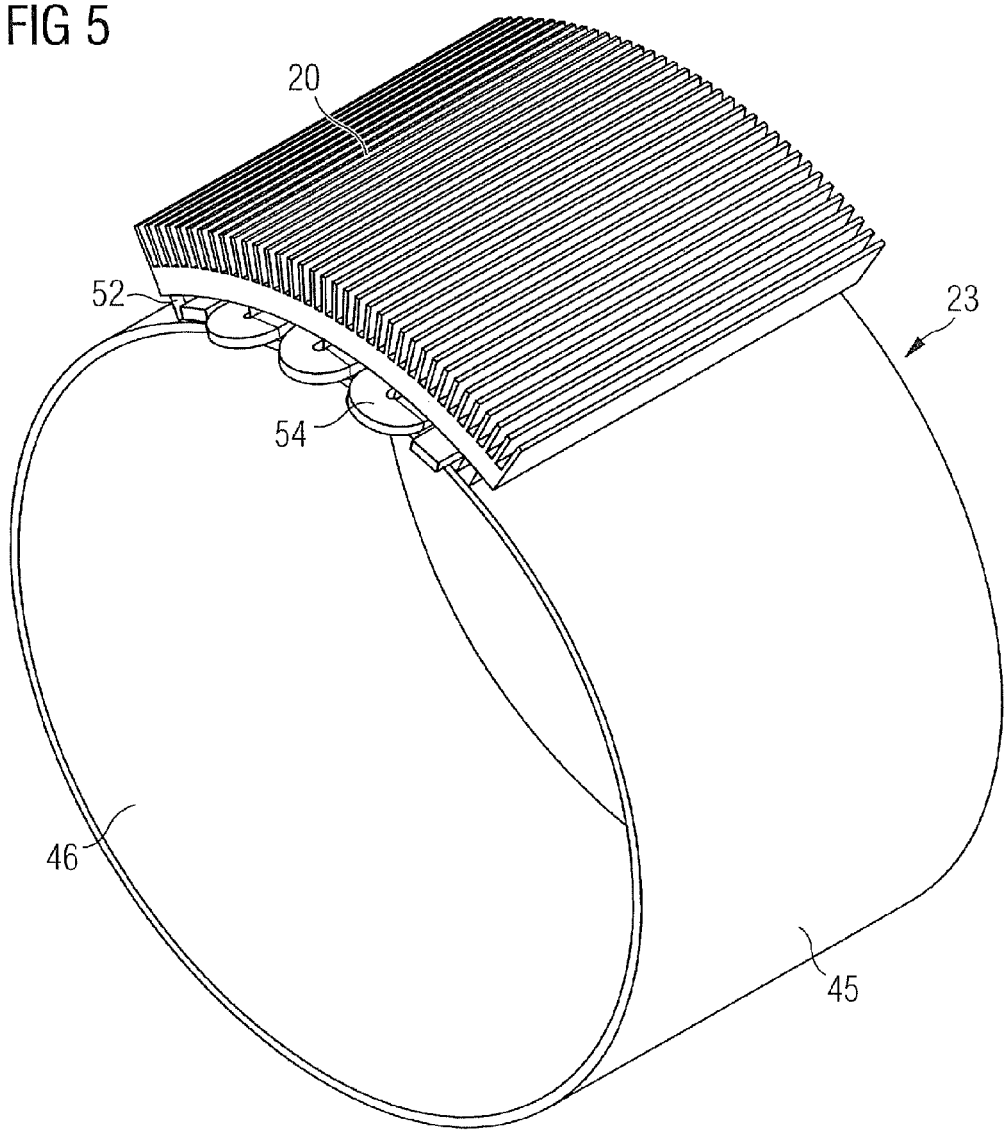
FIG. 5 and FIG. 6 show parts of the generator, cooled by the invented arrangement in another configuration, FIG. 7 up to FIG. 11 show different types of connection in view of the cooling-arrangement invented.
Figure 6:
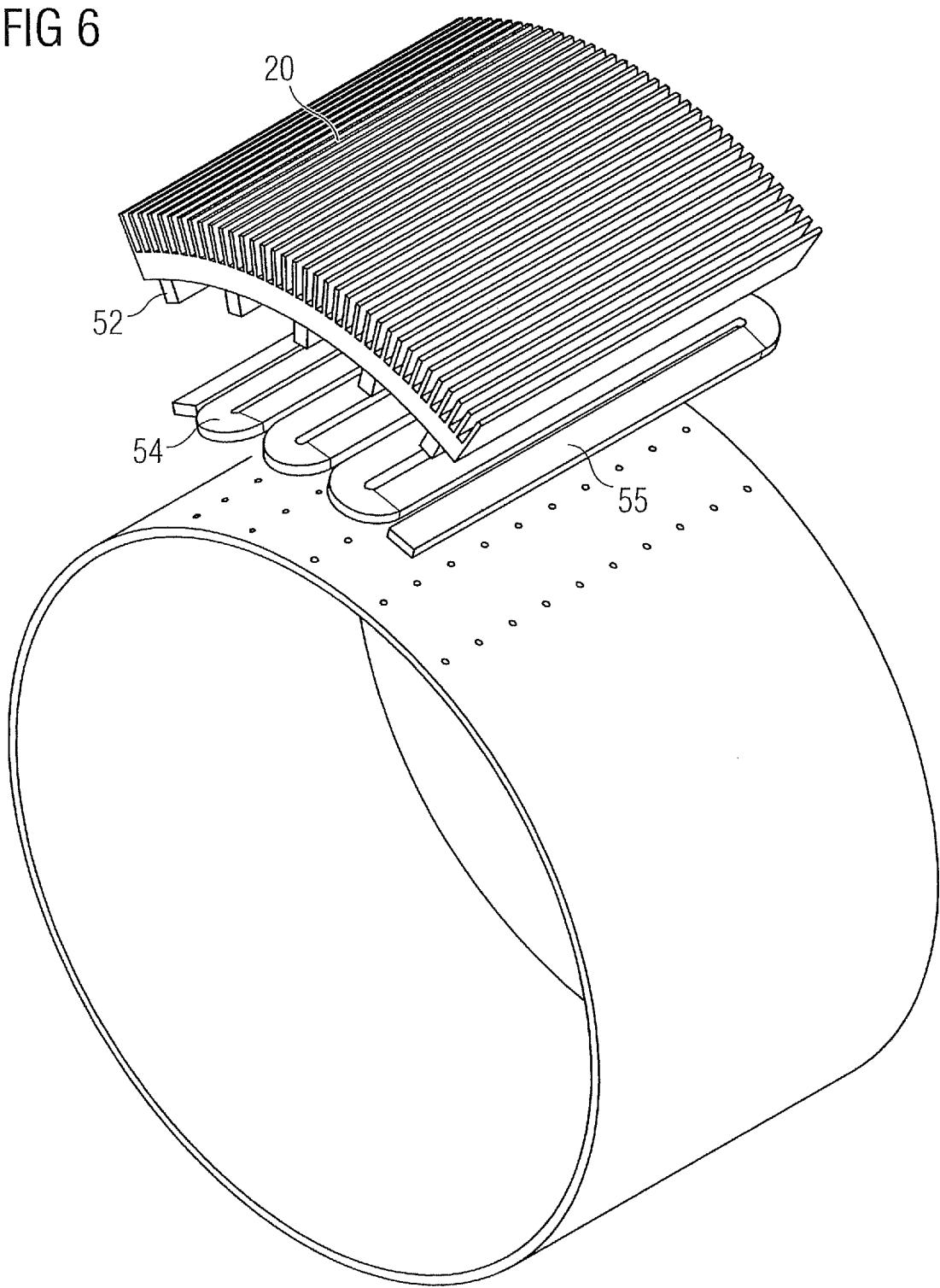

FIG. 5 and FIG. 6 show parts of the generator, cooled by the inventive arrangement, in another configuration.

Referring to FIG. 3 and FIG. 4 the cooling-channel 54 shows in this preferred configuration a rectangular cross-section.

The longer side of the cross-section of the cooling-channel 54 is pressed against the stator-arrangement 20 and/or the outer surface 45 of the support-structure 23.

Referring to FIG. 3 and FIG. 4 this enlarges the contact surface between the components.

The segment of the stator-arrangement 20 is supported by the support structure 23. The cooling-channel 54 and a number of transverse displacement rods 52 are located between the segment of the stator-arrangement 20 and the support-structure 23.

FIG. 6 shows the configuration of FIG. 5 in an exploded view.

Figure 7:
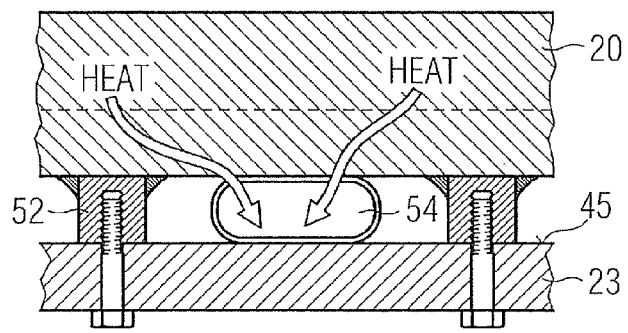
Figure 11:
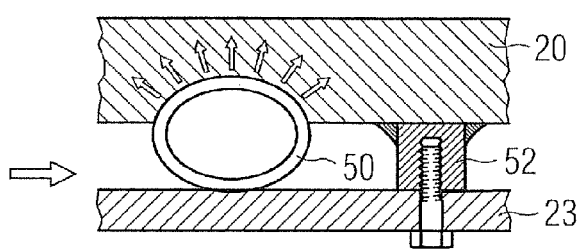

FIG. 7 up to FIG. 11 show different types of connection in view of the cooling-arrangement invented.

FIG. 7 shows in reference to FIG. 5 or FIG. 6 a preferred configuration of the invention.

The cooling-channel 54 is arranged between the stator-arrangement 20, while the stator-arrangement 20 comprises the stacked laminate plates LP, and the outer surface 45 of the support-structure 23 in such a way that the cooling-channel 54 is pressed by the stator-arrangement 20 against the support-structure 23 and/or vice-versa.

The displacement rod 52 defines a gap between the stator-arrangement 20 and the support-structure 23.

Bolts with a thread are used to fasten the stator-arrangement 20 with the support-structure 23.

The displacement rods 52 are welded to a laminate plate of the stator-arrangement 20.

Figure 8:
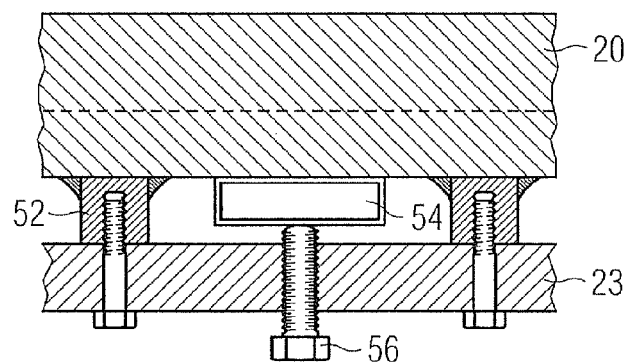

FIG. 8 shows a configuration of the invention, where the cooling-channel 54 is pressed against the stator-arrangement 20 by a bolt 56, while the bolt 56 penetrates the support-structure 23.

This allows releasing the cooling-channel 54 from the generator if needed, so that the cooling-channel 54 might be pulled out for repair-purposes or for exchange-purposes.

Figure 9:
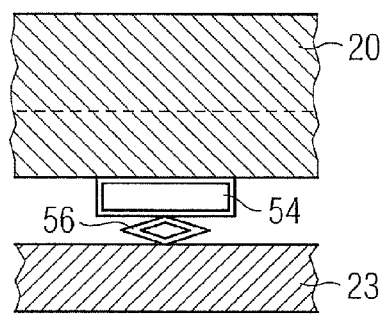

FIG. 9 shows a configuration of the invention, where the cooling-channel 54 is pressed against the stator-arrangement 20 by a spring 56. The spring is maintained between the outer surface of the support-structure 23 and the stator-arrangement 20.

This allows releasing the cooling-channel 54 from the generator if needed, so that the cooling-channel 54 might be pulled out for repair-purposes or for exchange-purposes.

Figure 10:
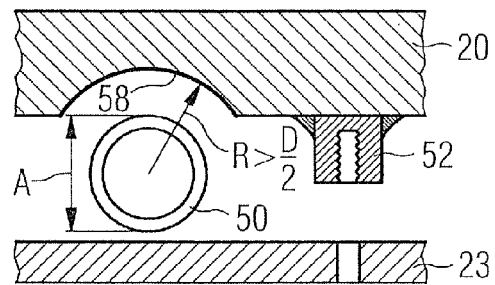

FIG. 10 shows a configuration of the invention where the cooling-channel 50 is prepared to be installed in a groove 58 of the stator-arrangement 20.

The radius of the groove 58 is larger than the radius of the cooling-pipe 50 in such a way that the cooling-pipe 50 becomes deformed when the stator-arrangement 20 is fastened to the support-structure 23.

FIG. 11 shows a configuration of the invention where the cooling channel 50 is arranged in a groove 58 of the stator-arrangement 20, so an effective thermal connection is obtained.

The invention claimed is:
1. An arrangement for cooling of an electrical machine, comprising:
a stator-arrangement mounted on an outer surface of a support structure;
a rotor-arrangement; and a cooling channel arranged between the stator-arrangement and support structure such that the cooling-channel is pressed between the stator-arrangement and the support structure,
wherein the cooling channel is pressed against the support structure by the stator arrangement or vice versa, such that the cooling channel is squeezed or deformed.

2. The arrangement according to claim 1, wherein the stator-arrangement is positioned on an outer-surface of the support structure to form a closed ring stator.

3. The arrangement according to claim 1,
wherein the stator-arrangement includes a plurality of stacked laminate plates, and
wherein the plurality of stacked laminate plates include slots to carry a stator-winding.

4. The arrangement according to claim 1,
wherein a plurality of displacement-rods are connected with the stator-arrangement for structural purposes, and
wherein the plurality of displacement-rods contain are designed to connect the stator-arrangement and the support structure.

5. The arrangement according to claim 4,
wherein the cooling-channel is arranged adjacent to the displacement-rods, so the cooling-channel is pressed between the stator-arrangement and the support structure when the displacement-rods are used connected to the support structure.

6. The arrangement according to claim 1,
wherein a contact-area between the cooling-channel and the stator-arrangement is filled with a thermal conductive material, and/or
wherein the contact-area between the cooling-channel and the support structure is filled with a thermal conductive material, and/or
wherein a volume between the cooling-channel and the stator-arrangement is filled with a thermal conductive material, while the conductive material encases the cooling-channel.

7. The arrangement according to claim 6,
wherein the thermal conductive material is a thermal paste or a resin, which contains thermal conductive properties.

8. The arrangement according to claim 4,
wherein a diameter of the displacement-rods defines a distance between the stator-arrangement and the support structure, and
wherein the distance is smaller than a cross-sectional dimension of the cooling-channel to allow pressing the cooling-channel between the stator-arrangement and the support structure.

9. The arrangement according to claim 1,
wherein the cooling channel becomes deformed while the stator-arrangement is connected with the support structure to increase the thermal contact between adjacent surfaces.

10. The arrangement according to claim 1,
wherein the cooling-channel is pressed against the stator-arrangement by a spring element, which is arranged between the cooling-channel and the support structure.

11. The arrangement according to claim 1,
wherein a plurality of cooling-channels are aligned in parallel, so that they penetrate the electrical machine along the longitudinal axes of the electrical machine.

12. The arrangement according to claim 1,
wherein the electrical machine is a direct-drive generator of a wind turbine.

13. The arrangement according to claim 1, wherein the electrical machine comprises a separate section of cooling-channels for each stator-segment.

14. The arrangement according to claim 1, wherein the electrical machine is an outer rotor-inner stator generator,
the stator-arrangement comprises a plurality of stator-segments forming the stator, and
each stator-segment comprises at least one cooling-channel, which is designed to cool the dedicated stator-segment, while the cooling-channel is connected directly with an assigned heat-transfer-unit.

* * * * *